United States Patent [19]
Denton et al.

[11] Patent Number: 5,651,136
[45] Date of Patent: Jul. 22, 1997

[54] SYSTEM AND METHOD FOR INCREASING CACHE EFFICIENCY THROUGH OPTIMIZED DATA ALLOCATION

[75] Inventors: James L. Denton; Richard James Eickemeyer; Kevin Curtis Griffin; Ross Evan Johnson; Steven Raymond Kunkel; Mikko Herman Lipasti; Sandra Kay Ryan, all of Rochester, Minn.

[73] Assignee: International Business Machines Corporation, Armonk, N.Y.

[21] Appl. No.: 470,315

[22] Filed: Jun. 6, 1995

[51] Int. Cl.$^6$ .................................................. G06F 12/00
[52] U.S. Cl. .................... 395/445; 395/481; 395/497.02
[58] Field of Search ........................... 395/445, 481, 395/497.01, 497.04, 456, 497.02

[56] References Cited

U.S. PATENT DOCUMENTS

| | | | |
|---|---|---|---|
| 4,910,656 | 3/1990 | Scales, III et al. | 364/200 |
| 4,914,573 | 4/1990 | Scales, III et al. | 364/200 |
| 5,091,851 | 2/1992 | Shelton et al. | 395/425 |
| 5,535,352 | 7/1996 | Bridges | 395/418 |

OTHER PUBLICATIONS

IBM Technical Disclosure Bulletin, vol. 37 No. 06A, Jun. 1994, "Instruction Placement Method to Improve Cache Behavior", pp. 247–248.

*Primary Examiner*—Tod R. Swann
*Assistant Examiner*—Christopher S. Chow
*Attorney, Agent, or Firm*—Terrance A. Meador

[57] ABSTRACT

Logic for decreasing the number of cache lines dedicated to user data. When pools for allocation are selected using a dynamic storage allocation procedure, the size of a data block is compared to the size of the allocated pool. If the comparison results meet a predetermined criterion, the logic aligns the data to the beginning of a cache line and places the header in a separate cache line that may be deallocated. And if the data will fit within one-half of a cache slot in the allocated pool, then the line or lines having the header data can be re-used as the header is deallocated. Otherwise, user data blocks are placed in cache lines that are spatially local.

16 Claims, 7 Drawing Sheets

SYSTEM AND METHOD FOR INCREASING CACHE EFFICIENCY THROUGH OPTIMIZED DATA ALLOCATION

BACKGROUND OF THE INVENTION

1. Field of the Invention

This invention relates generally to increasing cache efficiency, and particularly to a system and method employing intelligent data allocation to processor cache to increase the probability of getting cache hits while reducing paging.

2. Description of the Related Art

Modern high-performance data processors use a private high-speed hardware-managed buffer memory in front of the main data store to reduce average memory access delay at the Central Processing Unit (CPU). This high-speed buffer is denominated a "cache" because it is usually transparent to the applications programmer. Generally, the theory behind such a cache is that data which was once referenced by a program is likely to be needed again. By keeping such likely to be needed data in high-speed memory, overall performance is improved.

Since cache is transparent and operating systems typically have built-in memory allocation processes, most programmers do not design their programs with cache allocation in mind. Unfortunately, most cache allocation procedures fail to accurately consider the most likely scenario of the size of data that a program will need. Yet, allocation and use of memory have a significant effect on program execution performance. Recent empirical results from testing by computer scientists show that caching allocation inefficiencies, such as cache misses, can increase program execution by up to 25%. Such empirical results as well as popular allocation procedures are discussed in Dirk Grunwald, Benjamin Zorn, and Robert Henderson, "Improving the Cache Locality of Memory Allocation", *Proceedings of the ACM SIGPLAN '93 Conference on Programming Language Design and Implementation,* Albuquerque, N. Mex., June 1993, pp. 177–195.

The performance of cache memory is often characterized by "hit/miss" ratios. A "hit" means that a reference to the cache generated by a requesting CPU executable process locates the data item desired in high-speed cache memory, rather than in lower speed main memory. A "cache miss" is registered if the data is unavailable in cache memory. The performance of cache memory can also be measured indirectly in terms of paging. Paging refers to the process of transferring data blocks from secondary storage (e.g. a disk drive) to main memory. If requested data is not in main memory then paging is required to get the data. When the desired data is not located in main memory a page fault is said to have occurred. In terms of cache, a cache miss and a page fault may be related. A significant increase in paging indicate poor cache allocation and inefficient program performance. However, because of the direct relationship between cache performance and cache miss activity, the greatest benefit is derived from reducing cache misses.

Recently, processor speeds have been greatly increasing and this enhances the effects of cache memory allocation. An example of the radical increase in processor speeds can be seen by considering processors in personal computers. Early versions of processors for personal computers ran at about 4 Mhz but speeds of 100 Mhz are now commercially available to the general public. Processor speed is expected to continue this rapid upward ascent. Faster processor speeds have shifted interest from slower main memory to high-speed cache memory. Cache memory must be able to provide instructions and data to processors at very fast rates to keep up with the processor. New processors commonly use a smaller on-chip primary cache (processor cache) and a larger secondary cache in front of main memory.

Processor cache is small, fast storage that is dedicated to the processor. When the processor executes an instruction that references data in memory, the processor first looks in its on-chip cache for the data. If there is a cache hit, the data in the processor cache is used and there is no reason to access slower main memory cache. If the data is not in the processor cache, the main memory cache is referenced.

Dynamic storage allocators are responsible for allocating and deallocating memory including processor cache. Generally, such dynamic storage allocators operate according to some computer procedure to achieve a good allocation of available memory. Inherent in the procedure design is tension between the need to conserve memory on the one hand, and the need to minimize processor overhead associated with implementing the procedure. Such allocators do not allocate processor cache directly, rather, cache management hardware maps the allocation of main memory to a specific cache location based on a hash of the main memory address. Although allocation of cache memory is a secondary effect of the allocation of main memory, for the sake of brevity reference will be made to cache allocation as the ultimate result of such allocation without reference to steps in-between, such as the intervention of cache hardware to map the allocation of main memory to a specific cache location.

Procedures for dynamic storage allocation can be divided into three broad categories: sequential-fit procedures; buddy-system methods; and segregated storage procedures. The first two procedures are fairly complicated and therefore consume a lot of processor overhead. Generally, each of these two requires searching a doubly-linked freelist for free blocks sufficiently large for receiving data. Searching such a freelist, in addition to increasing CPU overhead may also lead to increased paging and cache misses because much more time is spent searching the freelist than allocating cache memory and locating cache data. The reason that the sequential-fit procedures and the buddy-system methods retain favor is that they each allocate cache space fairly efficiently without much wasted space. On the other hand, because of the complexity involved with each, neither is really a very good choice for a small amount of available cache that must be allocated and deallocated extremely fast, such as processor cache. Therefore, this leaves segregated storage procedures as a primary potentially viable candidate for processor cache.

Segregated storage procedures include a wide variety of approaches; however, one that has enjoyed widespread popularity is known as "BSD." The BSD procedure derives its name from the 4.2 BSD Unix software release in which it was first distributed in February, 1982. Essentially, the procedure rounds object size requests to powers of two minus a constant while maintaining a freelist of objects of each size class. If no objects of a particular size class are available, more storage is allocated. Because the procedure is so simple, it can be implemented very quickly without much processor overhead. Unfortunately, it also tends to waste a considerable amount of cache space, especially if the size requests are often slightly larger than the size classes provided. A considerable amount of fragmentation results as user data ends up distributed in several different places in cache. Fragmentation violates the well-known principle that it is generally better to cluster similar items in one place to increase efficiency of retrieval and so increasing performance of execution. When similar items, such as all of the data of a user data block are clustered together in memory then the memory is said to have good "spatial locality".

Another segregated storage procedure that is relatively fast to execute is known as "QUICKFIT." Unlike the BSD procedure, which rounds size requests to powers of two, QUICKFIT rounds to multiples of word sizes, e.g., 4, 8, or 16 bytes. Internal fragmentation is reduced because the size of pools allocated usually corresponds closer to that requested by application programs. However, any round off procedure is subject to internal fragmentation from the wasted space that is inherent in an approximation routine. Such fragmentation leads to an increased probability for cache misses and paging requirements. The trade-off of lower processor overhead from easy-to-compute round-off approximations imparts swift execution properties to the segregated storage procedures and makes them the best available allocators for processor cache. Yet, it would clearly be an improvement in the art to reduce the internal fragmentation of dynamic storage procedures without significantly increasing the amount of CPU overhead associated with their execution. It would also be an improvement to do the above without violating the principles of spatial locality to avoid increasing the effort of locating data.

SUMMARY OF THE INVENTION

In accordance with the objectives of this invention as described above and to overcome the limitations of the prior art, a system and method for reducing internal fragmentation of data placed in cache while increasing spatial locality characteristics is provided. Broadly speaking, after performing predetermined size testing the invention aligns data blocks to the beginning of a cache line to increase the likelihood that the data will span over the minimal number of cache lines, wherein a cache line is the smallest unit of storage that can be allocated or deallocated in the cache. The invention operates as logic that manages allocation and deallocation of cache memory and is enabled to operate with a dynamic storage allocator that allocates pools of cache slots containing cache lines for placing data in. The logic performs a test to compare the size of the requested data to the size of cache slots in a selected pool and then places the data in accordance with the results. Typically, the data is aligned so that the data header is placed in a different cache line than the data block itself. In such a case, the header may be deallocated to main memory and the cache line re-used. When the user data block is too large to fit in one cache line it is placed into two or more lines that are adjacent to each other.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

This invention is described in a preferred embodiment in the following drawing figures. In these figures, a like number shown in various figures represent the same or similar elements. While this invention is described in terms of the best mode for achieving this invention's objectives, it will be appreciated by those skilled in the art that variations may be accomplished in view of these teachings without deviating from the spirit or scope of the invention. In particular, certain aspects of this invention are described as operating as logic embodied as computer software in computer memory, but this invention could also be enabled as hardware logic by one skilled in the computer arts in view of these teachings.

System Architecture

Figure 1:
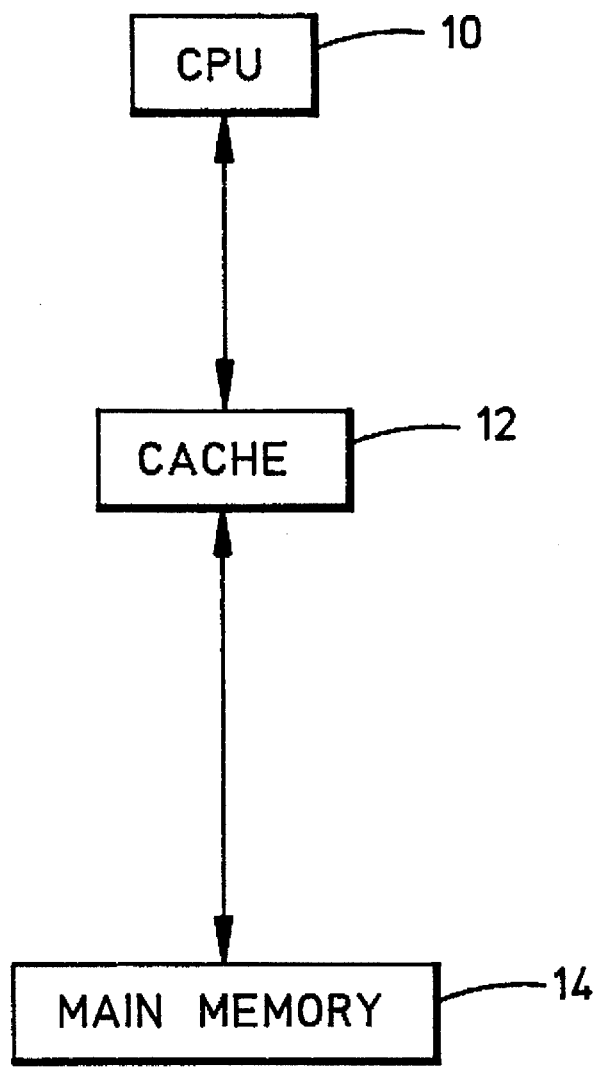
FIG. 1 is a functional block diagram of a distributed data processing system suitable for implementation of the system of this invention.

FIG. 1 shows a preferred environment for the operation of this invention. Central Processing Unit 10 is a high-performance central processing unit that is the central control unit of the hardware as well as the main engine for running software, including the logic of the present invention. Processor cache 12 is the high-performance data processor's private high-speed buffer memory that is hierarchically located in front of the main data store 14 to reduce average memory access delay.

Figure 2:
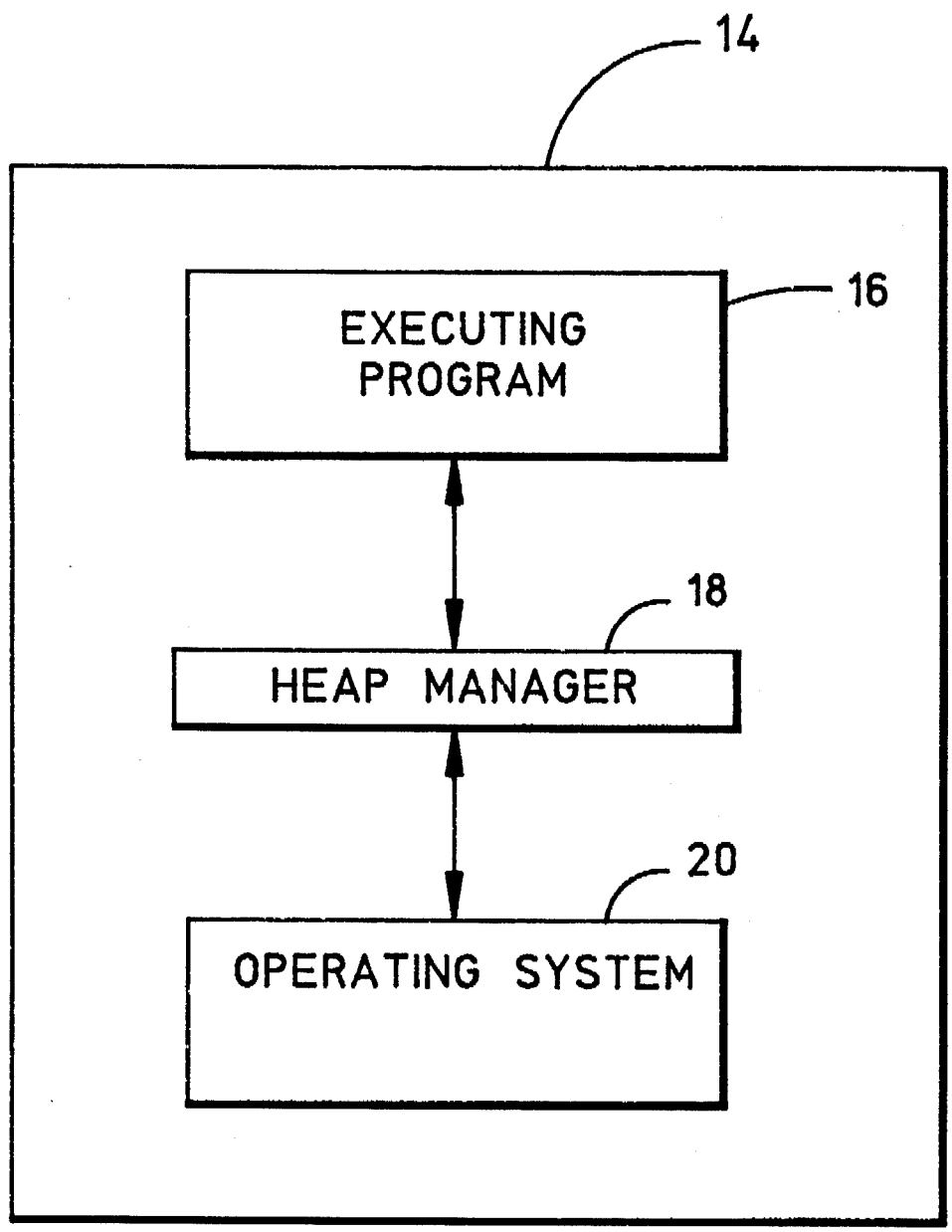
FIG. 2 is a functional block diagram of the architecture of the logic of this invention employed in the data processing system of FIG. 1.
Figure 3:
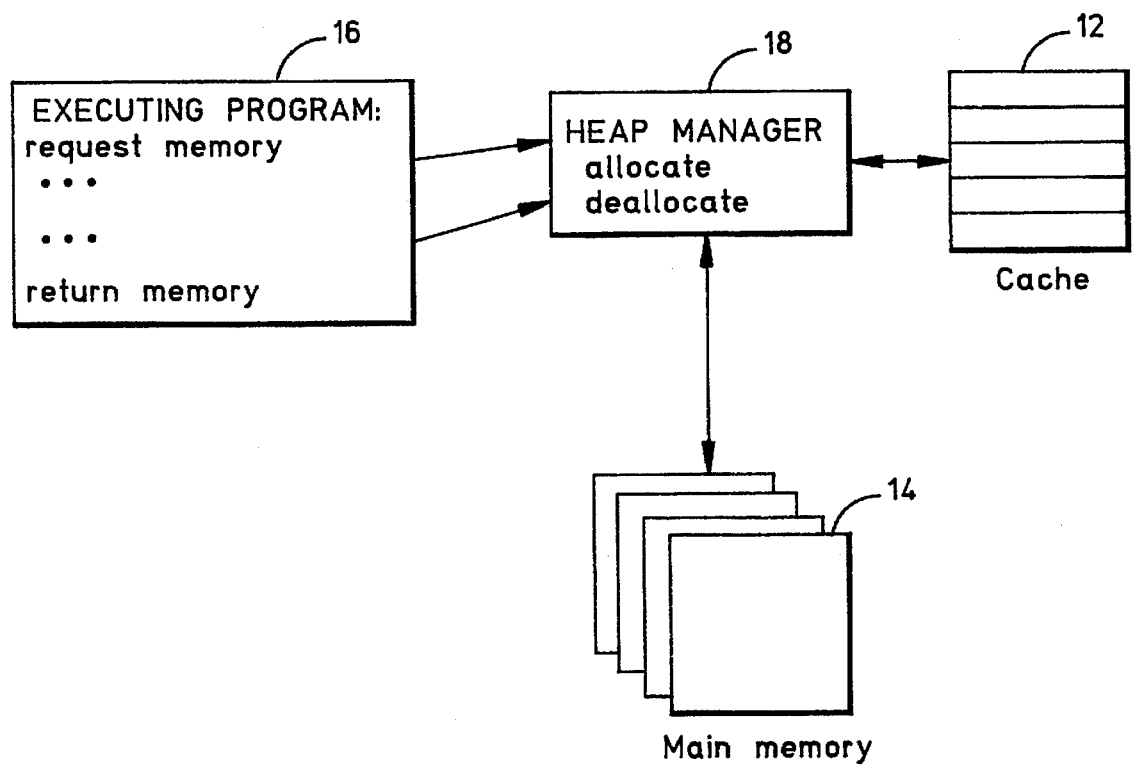
FIG. 3 is a diagram illustrating a simplified overview of the operation of the logic shown in FIG. 2.

Referring to FIGS. 2 and 3, the processor cache 12 is used to temporarily store "heap" retrieved from main memory 14. Heap refers to a collection of variables that a program dynamically allocates. The heap manager 18 which may be part of the operating system 20, or separate from it, acts to allocate heap from the main memory store 14 upon the request of an executing program 16 running in the processor. The heap manager is invoked when a program, such as program 16, executing in the processor needs some heap. Once invoked, the heap manager finds the proper heap and puts it in the processor cache. Thus, a heap manager is a specific type of dynamic storage allocator. In a preferred embodiment of this invention, the heap manager performs the allocation or deallocation of cache lines according to some dynamic storage allocation procedure.

Referring again to FIG. 2, operation of each of the respective logic programs described above is preferably enabled by loading each into main memory 14 to be executed by processor 10. Of course it will be apparent to those skilled in the art that such logic may also be embodied as hardware according to the teachings in this specification.

The heap manager of this invention preferably operates according to a segregated storage procedure and divides available memory into disjoint pools. Each pool is used to satisfy requests from executing programs and are allocated according to the size of the request. Preferably, pools vary in powers-of-two increments, in accordance with the BSD procedure described above. Thus, in a preferred embodiment the cache holds recently used data in naturally aligned power-of-two size lines, e.g. 16, 32, 64, and 128 bytes. The processor cache is divided into cache lines, wherein a cache line is the smallest unit of storage that can be allocated or deallocated in the cache. Although it is preferable to operate the dynamic storage allocator of this invention with a segregated storage procedure it is not absolutely essential and this should become apparent to those skilled in the art in view of the discussion of the operation below.

Data Structures

Figure 4A:
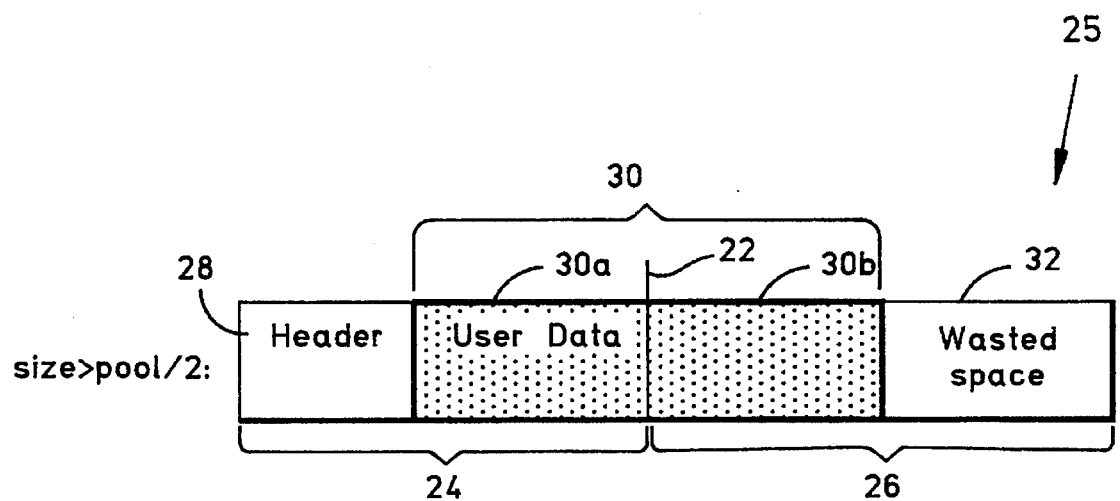
FIG. 4A shows a structure of data allocated in cache lines in the cache of FIGS. 1 and 3 showing user data split into more than one cache line.

FIG. 4A shows the data structure of cache lines 24 and 26 which are part of cache 12. This exemplary data structure is arranged so that it closely resembles the prior art, which serves as a useful comparison model to a desired structure enabled by this invention. Such a desired structure will be discussed in reference to FIG. 4B. A "cache slot" refers to an entity containing a grouping of contiguous cache lines. Cache slots containing the same number of cache lines are grouped together in "pools." When using the preferred procedure of grouping cache lines for slots according to a powers-of-two procedure, the pools contain slots having, for example, 2, 4, 8, 16, 32, 64, 128, etc. cache lines. Stated in mathematical notation, it is best to allow the data to be allocated over more than half of a cache slot (lines 24 and 26) when:

$$size > pool/2,$$

where "size" equates to the size of the user data block and "pool" is the size of the allocated pool for storing this data. Accordingly, user data block 30 is broken into two separate blocks 30a and 30b in respective cache lines 24 and 26, wherein each line is separated by cache line boundary 22. Together cache lines 24 and 26 compose cache slot 25. The header 28 is aligned at the beginning of line 24 and wasted space block 32 fills up the remainder of line 26. The header contains information regarding the data block, such as size and format of the data. A pointer is returned to the program indicating the address of the data in cache. The arrangement shown in FIG. 4A is unavoidable when the size of the data block is greater than a cache line; however, the prior art allocates the data in the cache according to an procedure that always arranges the data as shown in FIG. 4A so that the header is placed at the beginning of a slot, wherein a slot contains multiple cache lines. The disadvantage of such a non-discriminating approach is that cache space is wasted by such an arrangement. Regarding terminology, "user data" is used as a specific example of data to be stored; however, this invention is applicable to any type of data that needs to be stored.

One reason that cache space is wasted by such an arrangement as that shown in FIG. 4A, is that the header 28 is not a good use of cache because it is only referenced twice during the lifetime of the block allocation—once when the block is allocated and once again when it is deallocated. Thus, the header is said to "pollute" the cache because it is infrequently needed, yet consumes valuable cache space. Another reason that cache space is wasted by such an arrangement is that a fixed number of bytes exceeding the size of block 30b in line 26 simply cannot be used. Since there is only a finite amount of cache space available, indiscriminate use of such an arrangement technique will quickly exhaust cache and increase cache misses leading to increased paging.

Figure 4B:
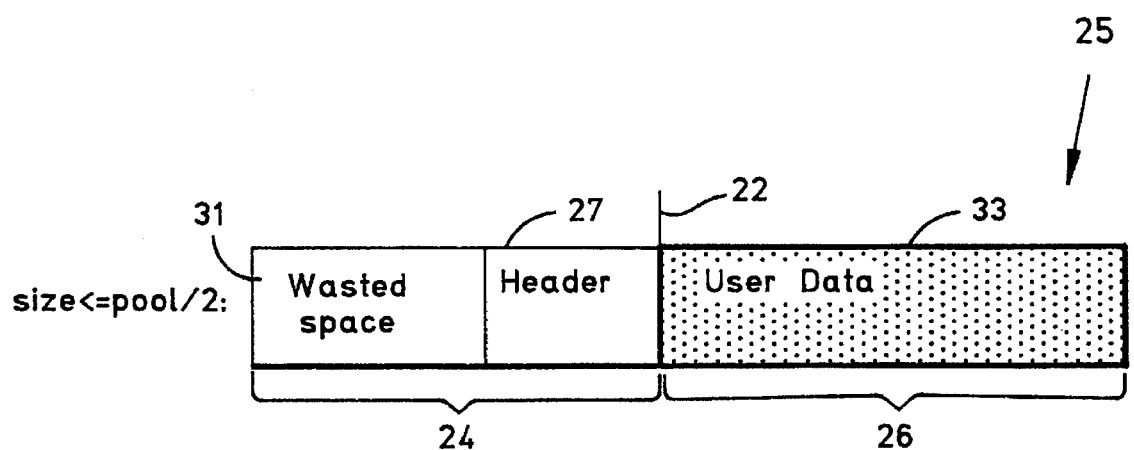
FIG. 4B shows a data structure allocated in the cache lines illustrated in FIG. 4A and employing the logic of FIG. 2 and showing user data aligned at the beginning of a cache line.

Typically, in accordance with the method of operating this invention, the structure of data placed in cache by the heap manager will correspond more closely with that shown in FIG. 4B. Generally, when the size of a data block fits into half of a pool size then the user data is aligned to the middle of a slot containing multiple cache lines, and the header is placed immediately ahead of the user data block in the preceding cache line. Since the header is seldom needed, it can be deallocated from cache and placed in main memory. Mathematically this arrangement is proper when the following condition is met:

$$size \leq pool/2,$$

where size and pool are variables as described above. Thus, header 27 and wasted space block 31 each reside in cache line 24, while the user data block 33 resides in cache line 26. This allows the data in cache line 24 containing the header portion to be deallocated from the cache so that the space can be re-used by data that is more frequently needed. The inventors have recognized that such an arrangement will greatly increase the performance of programs executing in the processor while decreasing the probability of cache misses. This is because empirical measurements indicate that while header information is only needed twice, user data, by contrast, is referenced at least an order of base-ten magnitude more often than that. Further, such an alignment of data within one cache line ensures spatial locality so the data can be located and retrieved swiftly. Hence the inventors have implemented a way to keep user data cache resident without header data to improve spatial locality and thereby increase overall performance.

Operation of Invention

Figure 5:
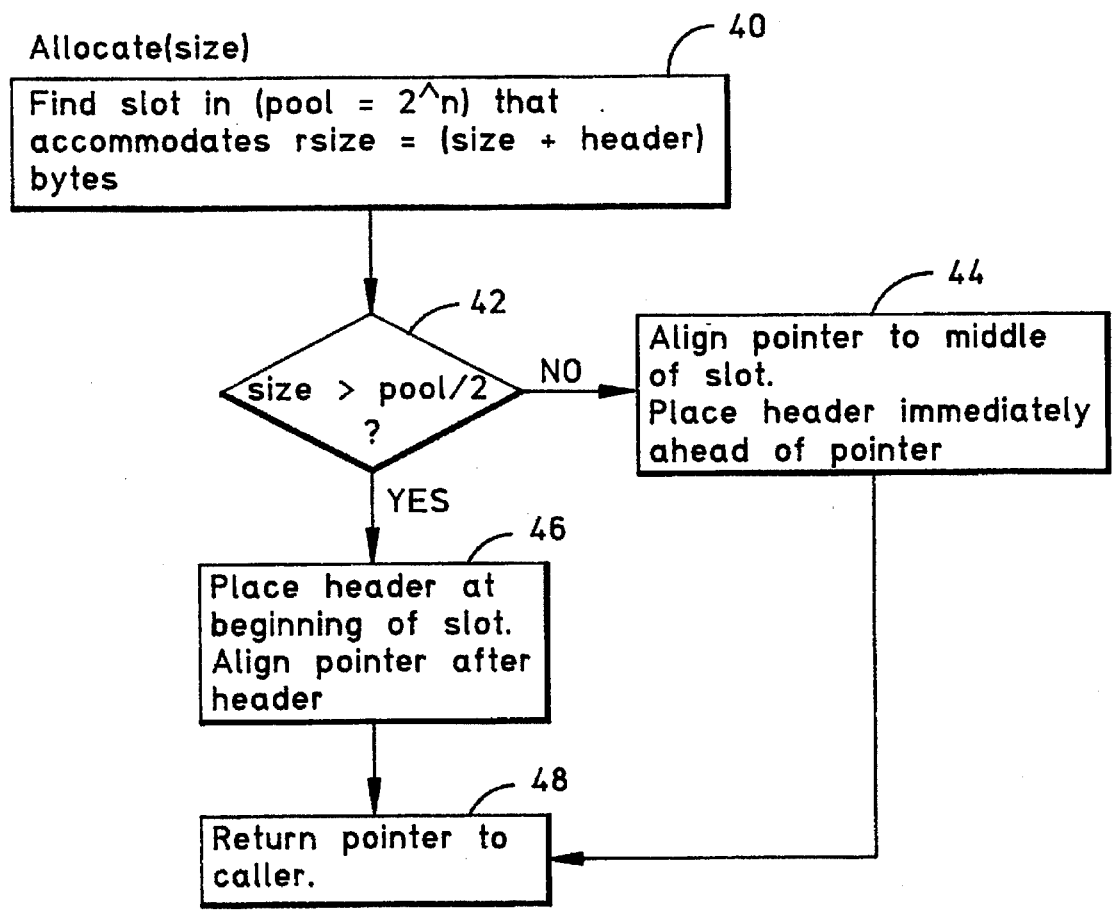
FIG. 5 is a flow diagram showing the operation of the invention.

FIG. 5 illustrates a preferred method of operation to achieve the objective of keeping user data cache resident without header data, if possible. The operation will be described generally and then with specific examples to clarify the teaching of this invention. In a preferred embodiment, the heap manager 18 is the primary actor which operates in main memory 14 to execute the steps shown in the flow chart of FIG. 5. Generally, in step 40, the heap manager allocates a slot containing multiple cache lines from an appropriate pool that is currently available in cache. The pool size must equal or exceed a variable denoted as request size, or in shorthand notation, "rsize", wherein rsize is equivalent to the size of the user data (size) plus the header size, i.e., $$rsize = size + header\ size\ (each\ in\ bytes).$$

In step 42, an inquiry is preformed to determine if size is greater than pool divided by two (i.e. "is size>pool/2 ?"). If the answer is "no" then in step 44 the pointer is aligned to the middle of the slot and the header is placed immediately ahead of the pointer. This yields the arrangement shown in FIG. 4B, and that arrangement is more desirable for increased efficiency and performance result for the reasons described above. In step 48, following step 44, the pointer is returned to the application program requesting the data. However, if the answer is "yes" then in step 46 the header is placed at the beginning of the slot and the pointer is aligned after the header and the pointer is returned to the application program, in following step 48. Step 46 yields the arrangement of data as shown in FIG. 4A, but does so only after determining that the arrangement yielded by step 44 and shown in FIG. 4B cannot be achieved because the size of the user data is too large to fit in one-half of the cache slot.

FIGS. 6A through 6E illustrate specific examples of various values of the above described variables, "size", "Header size", "rsize", "pool", as treated in accordance with the operation of this invention as described with reference to FIG. 5. Table 1 shown below summarizes the value for each variable in the example cases, as well as indicating the result of the determinative test performed in step 42 of FIG. 5. Therefore, reference should be made to Table 1 and FIG. 5 to fully comprehend the significance of the example data structures of FIGS. 6A through 6E. In Table 1, "size" refers to a user data block size of a data block that the processor has requested to use. "Header size" refers to the size of a header block that corresponds to and identifies the requested user data block. The "rsize" variable refers to "size" added to "Header size". "Pool" in the context of the table and FIGS. 5, and 6A–6B refers to the size of cache slots selected from a pool for allocation to store the user data block and the header. The column referring to "size>pool/2" is a predetermined criterion that is used in the operation of the invention. The column entitled "case" is an index to the drawing figure which shows the resulting data structure in such an example case as depicted in the respective line in the table where the figure is referenced.

TABLE 1

| size | Header size | rsize | pool | size > pool/2 | Case |
|------|-------------|-------|------|---------------|------|
| 15   | 16          | 31    | 32   | No            | 6A   |
| 16   | 16          | 32    | 32   | No            | 6B   |
| 17   | 16          | 33    | 64   | No            | 6C   |
| 55   | 16          | 71    | 128  | No            | 6D   |
| 65   | 16          | 81    | 128  | Yes           | 6E   |

Figure 6A:
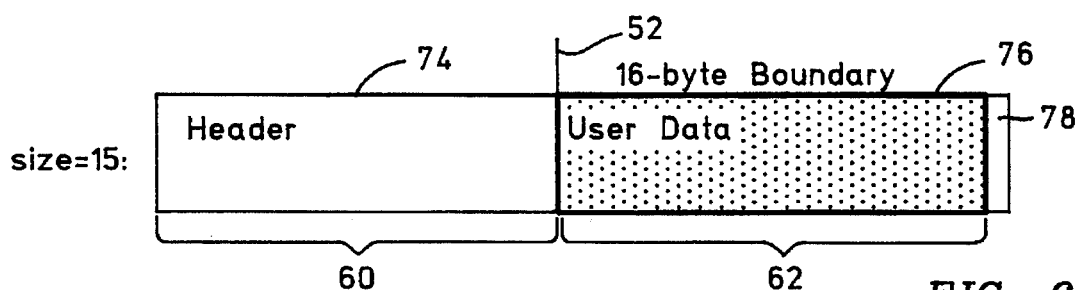
FIGS. 6A–6E are each exemplary data structures showing allocation of data cache in accordance with the operation of this invention shown in FIG. 5.

In FIG. 6A, the size of the user data block 76 for which a cache line must be allocated is 15 bytes, and the header size of header 74 is 16 bytes. Therefore rsize is (15 bytes+16 bytes) or 31 bytes and the pool is selected as the power-of-two sized slot closest to, but greater than or equal to 31 bytes. In this case the pool is 32 bytes. Thus, the determination of step 42 (FIG. 5) yields a "No" response because 15 bytes is not greater than (pool/2 or 32/2) bytes or 16 bytes. Therefore in accordance with step 44, the pointer is aligned to the middle 52 of the slot composed of cache line 60 and cache line 62, each line being 16 bytes in length. The header 74 being 16 bytes in length, completely fills cache line 60 but it can be immediately deallocated to free this space for use by other programs. The user data block 76 plus 1 byte wasted space block 78 fills the 16 byte cache line 62. Notably, this example illustrates that this invention optimally allocates cache lines while introducing very little overhead to processor 10.

Figure 6B:
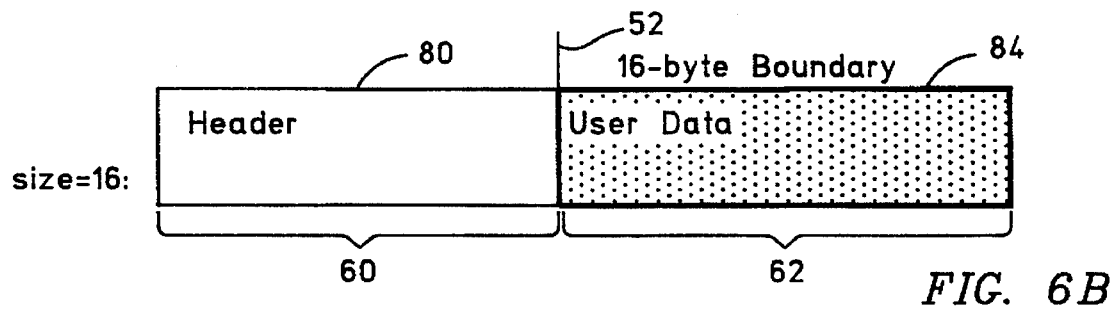

Another example illustration is shown if FIG. 6B, wherein size is 16 bytes and all of the other variables and the determinative result of step 44 is the same as illustrated in the case of FIG. 6A. In this case header 80 completely fills cache line 60 and user data block 84 completely fills cache line 62. There is absolutely no wasted space in either cache line and the header may be immediately deallocated to free up the cache space. This example illustrates the absolute best case where the user data block is exactly equal to the size of a cache line.

Figure 6C:
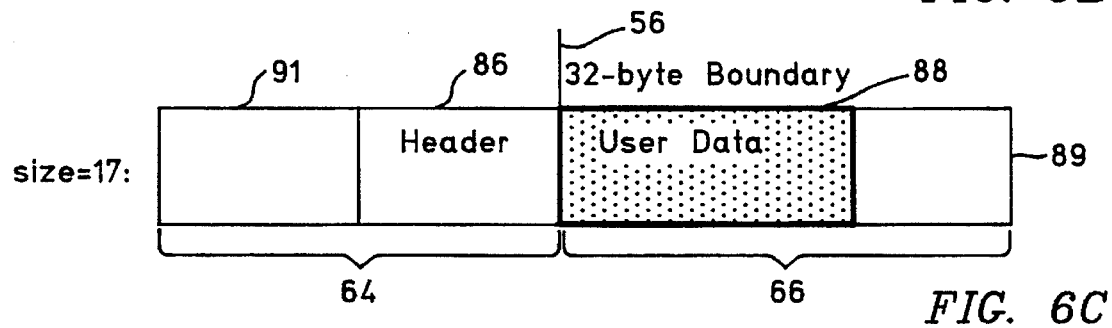

Still another example is shown in FIG. 6C, wherein the size of the user data block 88 is 17 bytes and the header 86 is 16 bytes. In this case the rsize is 33 bytes so the pool of 32 bytes cannot be selected, but rather a pool of 64 byte size is selected. The determinative step 42 (FIG. 5), compares 17 bytes (size) to 32 bytes (pool/2) and determines that it is proper to perform step 44 so that the pointer is aligned to the middle 56 of the slot and the header is placed immediately ahead of the pointer in cache line 64 where it can be deallocated. User data block 88 is allocated in cache line 66 and there is 15 bytes of wasted space block 89 in that line as well. However, wasted space block 91 of 16 byte size can be recovered when the header 86 is deallocated. This example illustrates the benefit of the invention where the minimum amount of space is wasted and space locality is maintained even when the size of a data block is significantly smaller than the size of a cache line.

Figure 6D:
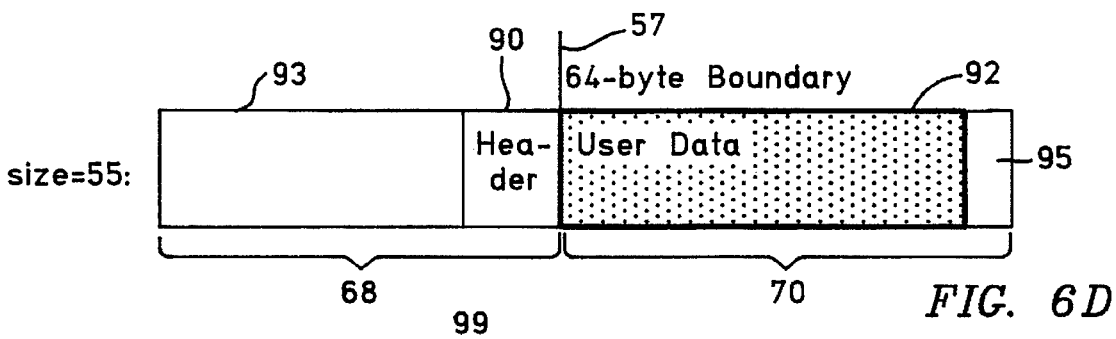

An example of the invention's applicability for handling a relatively large user data block, such as user data block 92 of 55 bytes is shown in FIG. 6D. In this case the header size is once again chosen to be 16 bytes and so rsize is 71 bytes. The next largest power-of-two sized pool is selected at 128 bytes. Again the answer to the determinative step 42 (FIG. 5) is "No" and the resulting data structure is shown in FIG. 6D, where the header 90 of 16 bytes is placed in cache line 68 to the left of the middle 57 of the 128 byte slot and the user data block 92 is placed in cache line 70 to the right of the middle. As before the 16 byte header may be deallocated and the entire 64 byte cache line 68 is once again available to the heap manager for allocation. The only inefficiency is wasted space block 95 of 9 bytes in length because wasted space block 93 (48 bytes) can be recovered once the header is deallocated.

Figure 6E:
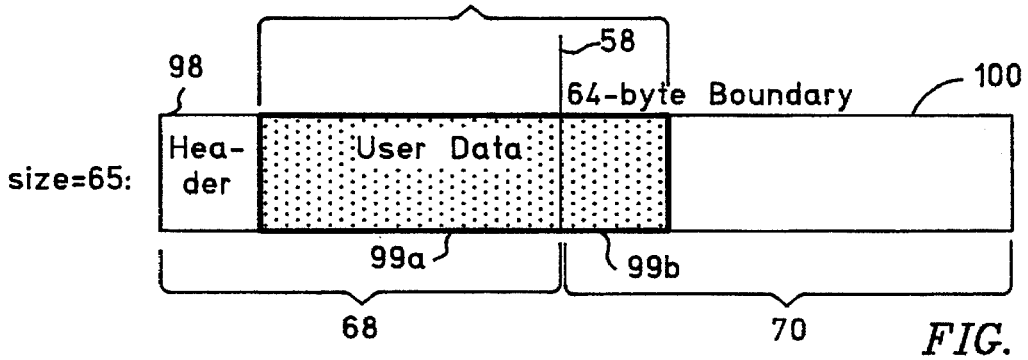

Finally, another example shown in FIG. 6E illustrates a case when the user data must be split over two cache lines 68 and 70. In this case the user data block 99 is 65 bytes long. Since the header is 16 bytes, rsize is 81 bytes. In this case a pool of 128 bytes is properly selected, but the answer to the determinative step 42 (FIG. 5) is "Yes" because 65 bytes (size) is greater than 64 bytes (128/2). Therefore, the header 98 is placed at the beginning of the slot in cache line 68 and the pointer is aligned after the header. Following the pointer, the user data block 99 is arranged and broken into blocks 99a and 99b, with 99a in line 68 and 99b in line 70. Space block 100 is wasted as the user data block is allocated over two lines; however, this situation exists because the size of the data block is simply too large and must cover two cache lines. In accordance with this invention, this arrangement is created because the user data block is too large to fit in one cache line.

It should be recognized that although the particular procedure used to select pool sizes in these examples is one which selects from powers-of-two candidates, the principles of this invention are applicable to any allocation storage procedure that chooses pool candidates with cache slots large enough to contain a requested user data block and its header and where the cache slot contains two or more contiguous cache lines to be allocated. This invention is particularly useful when implemented with a dynamic storage allocator that uses a segregated storage procedure that chooses pools candidates from slots having sizes grouped in powers-of-two. This invention is clearly an improvement in the art because it reduces cache misses without significantly increasing the amount of CPU overhead associated with the execution of a storage allocation procedure.

This invention has the following significant advantages that are derived from ensuring that user data blocks are compacted into a minimal number of closely located cache lines. The amount of storage overall is not increased so paging is not increased. The total number of cache lines consumed by any block of user data is decreased. Cache utilization is increased by a factor of:

$$n/(n-1),$$

where n is an integer that is greater than or equal to 2 and represents the number of cache lines consumed by user data block, for those requests that meet the criterion of (size≦pool/2). Further since the number of cache lines used is decreased the number of lines marked as "dirty" in a "write-back" cache system is decreased (i.e., in a write-back system cache management hardware must keep up with data that has been changed without having first informed main memory management software). Since the number of dirty lines are decreased the need to rewrite this data to main memory is decreased by the same factor of "n/(n−1)" where n must satisfy the criteria described above. For those systems that pre-fetch data, the lagging effect of locating all of the requested data is reduced because of the improved spatial locality. Because the method is simple, the impact on the performance of allocating and deallocating is minimal, yet overall performance of the system is increased.

Figure 7:
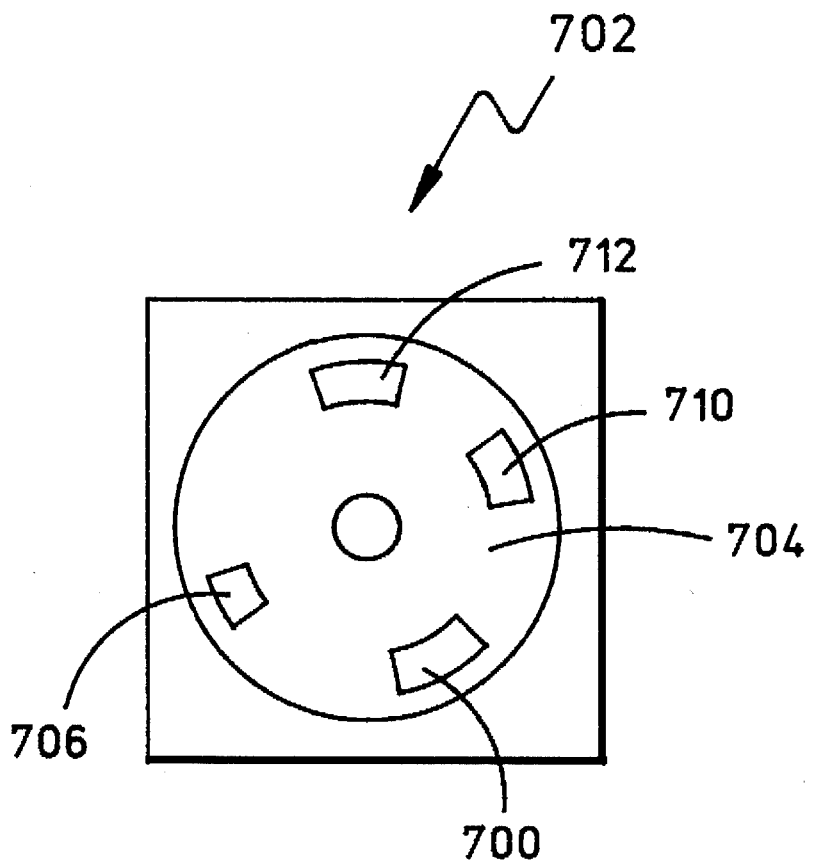
FIG. 7 is an article of manufacture or a computer program product including a storage medium for storing thereon program means for carrying out the method of this invention in the data processing system of FIG. 1.

While this invention is primarily discussed as a method, it can be understood by a person of ordinary skill in the art that the apparatus discussed above in connection with FIGS. 2 and 3 may be programmed or otherwise designed to facilitate the practice of the method of this invention. Also, an article of manufacture, such as a pre-recorded floppy disk 702 in FIG. 7 or other similar computer program product, for use with a data processing system, could include a storage medium, such as magnetic storage medium 704, and program means recorded thereon, such as program means 706, 700, 710 and 712, for directing the data processing system of FIG. 2 to facilitate the practice of the method of this invention. It will be understood that such apparatus and articles of manufacture also fall within the spirit and scope of this invention.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing.

What is claimed is:

1. In a computer system having a processor, a main memory store, and a cache memory that is divided into separate cache slots, each cache slot having multiple cache lines, a method for allocating cache lines within a cache slot for storing a data block of data block size and a corresponding header block of header block size that identifies the data block, the method comprising the machine-executed steps of:

responsive to a request from the processor to use a data block, allocating a cache slot having a slot size to store the requested data block and its corresponding header block, wherein the slot size is larger than the data block size plus the size of the header block;

referencing a predetermined size criterion defining a relationship between the data block size and the cache slot size to determine if the predetermined size criterion is met by this allocation; and aligning the data block and the corresponding header block within the multiple cache lines in the cache slot according to whether the predetermined size criterion is met, by:

(a) aligning the data block to the beginning of a first half of the cache slot and placing a corresponding header block that identifies the data block in a second half of the cache slot if the predetermined size criterion is met; or (b) aligning the header block to the beginning of the second half of the cache slot and placing the data block next to the header block so that part of the data block fits in the second half of the cache slot and the remainder of the data block fits in the first half of the cache slot if the predetermined size criterion is not met.

2. The method of claim 1, wherein the predetermined size criterion is met if the size of the data block is less than or equal to the size of the cache slot divided by two.

3. The method of claim 1, step (a) further comprising the machine-executed steps of:

(a1) transferring the header block from the second half of the cache slot into main memory; and (a2) deallocating the second half of the cache slot following the transferring of the header block.

4. The method of claim 1, wherein the cache slot is selected from a plurality of cache slots grouped in a pool of cache slots and each cache slot grouped together in a pool has the same slot size as each other cache slot in the pool, wherein each pool is selected according to a segregated storage procedure.

5. The method of claim 4, wherein the segregated storage procedure selects pools having cache slots with sizes that are ordered in powers-of-two.

6. A computer system for allocating cache lines within a cache slot for storing a data block of data block size and a corresponding header block of header block size that identifies the data block, the system comprising:

a processor;

main memory coupled to the processor;

cache memory coupled to the main memory and also coupled to the processor;

dynamic storage allocation logic that is loaded into main memory for performing the allocation of cache lines; and the dynamic storage allocation logic having machine-executed means coupled to the processor for aligning the data block and the corresponding header block in response to a processor request to use a data block by:

allocating a cache slot having a slot size to store the requested data block and its corresponding header block, wherein the slot size is larger than the data block size plus the size of the header block;

referencing a predetermined size criterion defining a relationship between the data block size and the cache slot size to determine if the predetermined size criterion is met by this allocation; and aligning the data block and the corresponding header block within the cache lines in the cache slot according to whether the predetermined size criterion is met;

the machine executed means including:

means for aligning the data block to the beginning of a first half of the cache slot and placing a corresponding header block that identifies the data block in a second half of the cache slot if the predetermined size criterion is met; and means for aligning the header block to the beginning of the second half of the cache slot and placing the data block next to the header block so that part of the data block fits in the second half of the cache slot and the remainder of the data block fits in the first half of the cache slot if the predetermined size criterion is not met.

7. The system of claim 6, the means for aligning the data block further including data transferring means to transfer the header block from the second half of the cache slot into main memory and means for deallocating the second half of the cache slot following the transferring of the header block.

8. The system of claim 6, wherein the predetermined size criterion is met if the size of the data block is less than or equal to the size of the cache slot divided by two.

9. The system of claim 6, wherein the cache slot is selected from a plurality of cache slots grouped in a pool of cache slots and each cache slot grouped together in a pool has the same slot size as each other cache slot in the pool, wherein each pool is selected according to a segregated storage procedure.

10. The system of claim 9, wherein the segregated storage procedure selects pools having cache slots with sizes that are ordered in powers-of-two.

11. A computer program product for use in a computer system having a processor, a main memory store, and a cache memory that is divided into separate cache slots, each cache slot having multiple cache lines, the computer program product being adapted for allocating cache lines within a cache slot for storing a data block of data block size and a corresponding header block of header block size that identifies the data block, the computer program product comprising:

a recording medium;

first means, recorded on the recording medium, for being responsive to a request from the processor to use a data block by allocating a cache slot having a slot size to store the requested data block and its corresponding header block, wherein the slot size is larger than the data block size plus the size of the header block;

second means, recorded on the recording medium, for referencing a predetermined size criterion defining a relationship between the data block size and the cache slot size to determine if the predetermined size criterion is met by this allocation; and third means, recorded on the recording medium, for aligning the data block and the corresponding header block within the multiple cache lines in the cache slot according to whether the predetermined size criterion is met;

the third means including:

means for aligning the data block to the beginning of a first half of the cache slot and placing a corresponding header block that identifies the data block in a second half of the cache slot if the predetermined size criterion is met; and means for aligning the header block to the beginning of the second half of the cache slot and placing the data block next to the header block so that part of the data block fits in the second half of the cache slot and the remainder of the data block fits in the first half of the cache slot if the predetermined size criterion is not met.

12. The computer program product of claim 11, wherein the predetermined size criterion is met if the size of the data block is less than or equal to the size of the cache slot divided by two.

13. The computer program product of claim 11, the means for aligning the data block further including means for transferring the header block from the second half of the cache slot into main memory, and also further including means, recorded on the medium, for deallocating the second half of the cache slot following the transferring of the header block.

14. The computer program product of claim 11, wherein the cache slot is selected from a plurality of cache slots grouped in a pool of cache slots and each cache slot grouped together in a pool has the same slot size as each other cache slot in the pool, wherein each pool is selected according to a segregated storage procedure.

15. The computer program product of claim 14, wherein the segregated storage procedure selects pools having cache slots with sizes that are ordered in powers-of-two.

16. An apparatus for storing a data block of data block size and a corresponding header block of header block size that identifies the data block in a cache memory, the apparatus comprising:

a processor;

main memory coupled to the processor;

cache memory coupled to the main memory and also to the processor, the cache memory being divided into separate cache slots, each cache slot having multiple cache lines;

dynamic storage allocation logic loaded into the main memory for allocating a cache slot for storing the data block and its corresponding header block; and the dynamic storage allocation logic including:

a processor request module that is adapted to be responsive to a request from the processor to use a data block, by allocating a cache slot having a slot size to store the requested data block and its corresponding header block, wherein the slot size is larger than the data block size plus the size of the header block;

a referencing and criterion determining module that is adapted to reference a predetermined size criterion defining a relationship between the data block size and the cache slot size to determine if the predetermined size criterion is met by this allocation; and an alignment module that is adapted to align the data block and the corresponding header block within the multiple cache lines in the cache slot according to whether the predetermined size criterion is met by, either, aligning the data block with a beginning of a first half of the cache slot and placing the corresponding header block in a second half of the cache slot if the predetermined size criterion is met;

or, aligning the corresponding header block with a beginning of the second half of the cache slot and placing the data block next to the header block, with a portion of the data block being in the second half of the cache slot.

* * * * *